Patented Nov. 15, 1932

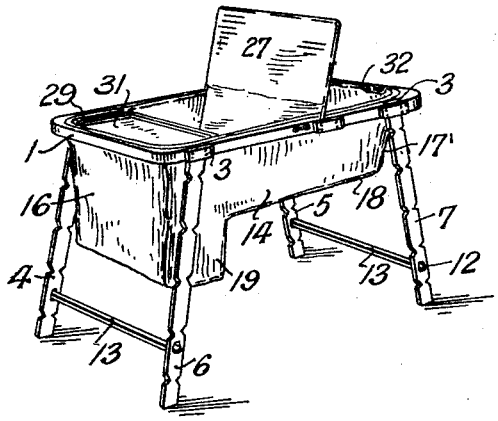
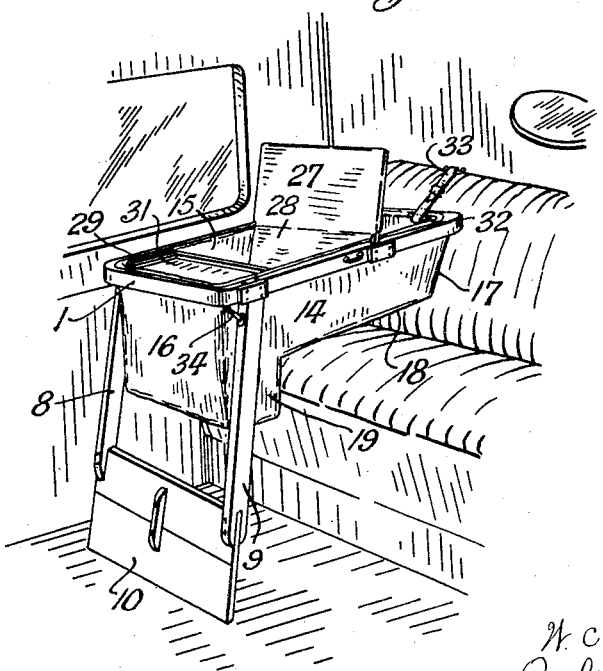

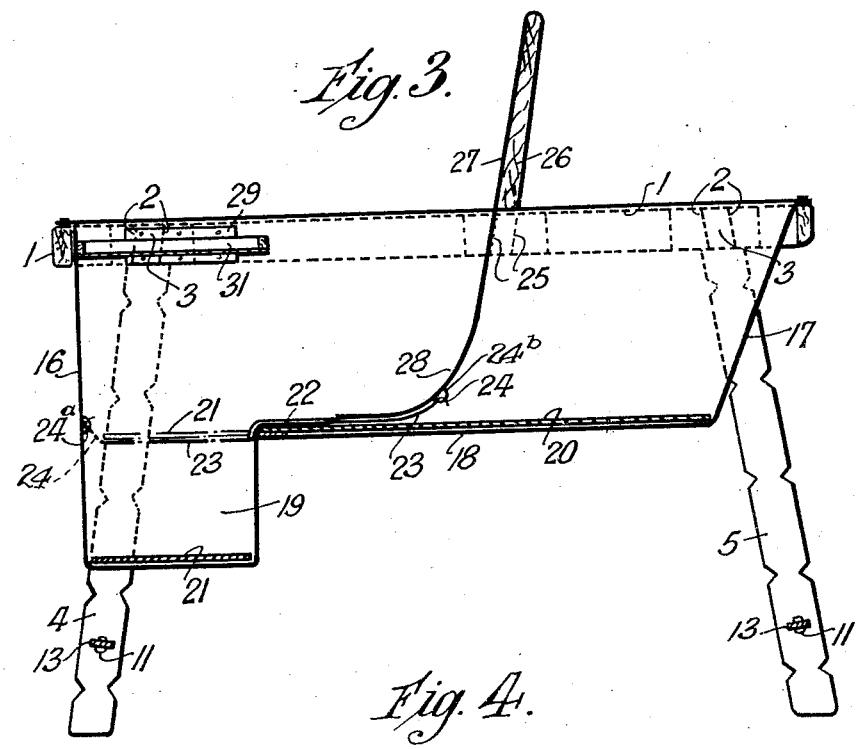
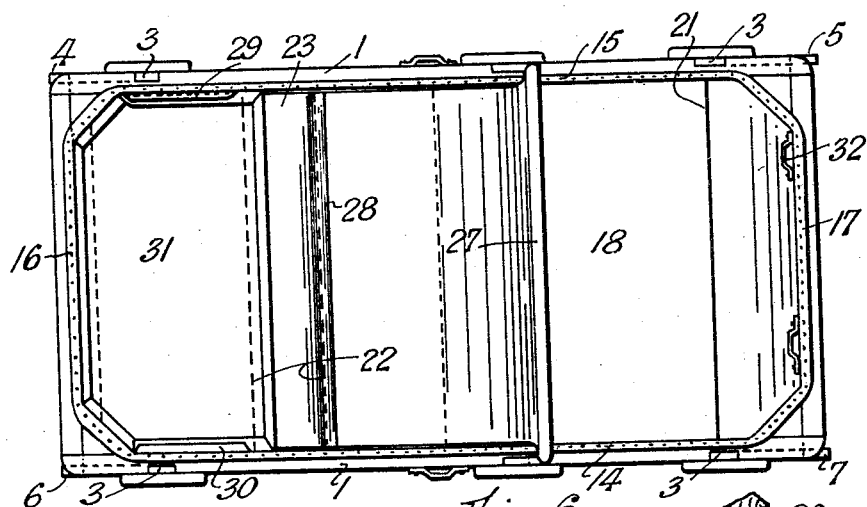
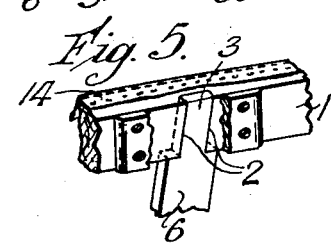
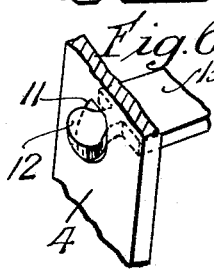
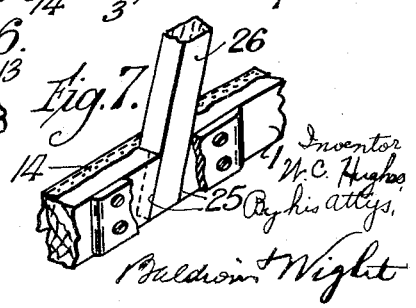

1,887,810

UNITED STATES PATENT OFFICE

WILLIAM CLARE HUGHES, OF HARROLD, ENGLAND, ASSIGNOR OF ONE-HALF TO CHARLES MACAN RICE, OF MEDBOURNE, LEICESTERSHIRE, ENGLAND

COMBINED COT AND PLAY-CHAIR, PARTICULARLY ADAPTED FOR USE IN MOTOR CARS AND OTHER VEHICLES

Application filed February 7, 1930, Serial No. 426,637, and in Great Britain May 18, 1929.

This invention relates to a cot which may be adapted for use as a play chair and use in motor cars and other vehicles.

According to the present invention a cot is provided at one or both ends with detachable legs and with means such as straps receiving hasps whereby it is adapted to be anchored within an automobile or other vehicle, for example, from one of the members of the seat framework.

In order to enable the cot to be converted into a play-chair, the cot may be adapted detachably to receive a back rest and be provided with a base which can be adapted to form a well for the reception of the child's legs, another portion of the base of the cot constituting the seat of the play-chair. The cot may also be provided with members which are adapted to receive a detachable table for the play-chair.

The invention is illustrated in the accompanying drawings, in which Fig. 1 is a perspective view showing the cot adapted for indoor use as a play-chair, Fig. 2 showing the cot supported within an automobile, Fig. 3 a detail sectional elevation and Fig. 4 a detail plan view. Figs. 5, 6 and 7 are detail perspective views.

1 is a rigid frame in each side of which are formed sockets 2 inclined to the vertical as best shown in Fig. 5. The sockets are adapted to receive the tongued ends 3 of either of legs 4, 5, 6, 7 or of a rigid support formed by legs 8, 9 permanently united by a cross-board 10, the angular setting of the sockets causing the legs 4, 5, 6 and 7 to assume a slanting position. The latter legs are provided near their lower ends with slots 11 which are of greater length than width and are adapted to receive the dovetail-shaped ends 12 of cross-bars 13. The legs can thus be detachably connected adjacent their lower ends by passing the dovetail ends 12 thereof through the slots 11 and then turning the cross-bars through 90°, the cross-bars being prevented from withdrawal.

The length of the cross-bars 13 between the dovetail ends is slightly greater than the transverse distance between the sockets 2 whereby when the cross-bar is inserted with legs, the legs 4, 5, 6 and 7 are sprung outwardly in a transverse direction and thus there is set up sufficient friction between the tongued ends of the legs and the sockets to prevent the legs from falling out.

The body of the cot is formed of canvas or like flexible material, the canvas forming the sides 14 and 15 ends 16 and 17 and a portion of the base 18 of the cot. The canvas is also fashioned to form a well 19, upon the base of which and also on the canvas base 18 are laid floor-boards 20, 21, the floor-board 20 being positioned by entering a pocket 22 formed by sewing a strip of canvas to the base 18. A further strip or flap 23 of canvas is sewn to the end of the base portion 18 and is provided along its free edge with hooks 24 adapted to engage eyelets 24ª secured to the end 16 of the cot to secure the strip or flap 23 in a position closing the well 19 as suggested by the dot-dash lines in Figure 3.

The frame 1 is also provided with sockets 25 arranged at an angle to the vertical and adapted to receive uprights 26 over which is slipped a bag-shaped canvas back support 27 which is extended to form a strip 28 having eyelets 24ᵇ for fastening engagement by the aforesaid hooks 24 when the strip or flap 23 is in a position uncovering the well 19 as best shown in full lines in Figures 3 and 4.

To the frame are also secured guides 29, 30 for receiving a tray 31 and at the rear end of the inner face of the frame are secured staples 32.

In Figs. 1, 3 and 4 of the drawings, the device is shown adapted for use as an indoor play-chair, the legs 4, 5, 6, 7 being inserted in the sockets 2 and united by the cross-bars 13, the support 27 having uprights 26 fitted in the sockets 25, the flap 23 turned back and hooked on the eyelets on the strip 28, the floor-board 21 placed at the bottom of the well and the tray being in position.

When it is desired to convert the device into a cot for indoor use, the support 27 and uprights 26 are removed, the tray 31 is removed, the floor-board 21 removed from the bottom of the well 19 and placed on the flap 23 which in this case is unhooked from the strip 28 and hooked on to the end 16 of the cot, the well thus being closed.

If it be desired to adapt the cot or the play-chair for use in an automobile, the rear legs 5 and 7 are removed, and the front legs 4 and 6 replaced by the rigid support 8, 9, 10. The cot or play-chair is then placed in the automobile with the rigid support resting on the floor and the back of the frame 1 resting against the cushion of the rear seat, whereafter straps 33 (see Fig. 2) are passed through the staples 32 on the top of the frame and through staples secured above the top of the said cushion.

Preferably one of the legs 8, 9 of the rigid support is provided with a hook 34 for engaging an eye secured to the frame 1.

As the support is at an angle, there is a continuous thrust exerted against the cushions and wear thereof substantially eliminated.

It will be seen that the various parts of the complete device can be packed up into a very small space.

What I claim is:—

1. A car-cot comprising in combination, a frame, a flexible body suspended from and hanging below said frame, strap receiving staple means adjacent the head of said frame for anchoring a suspension support, leg supporting means for the foot of said frame comprising uprights connected at the bottom by a cross board, extending below said uprights and sockets in the frame for detachably receiving said leg supporting means.

2. A cot convertible into a playchair comprising in combination, a frame, a flexible body suspended from and below said frame and being fashioned at the front to form a well, a flap for covering the well, a back-rest detachably mounted on said frame to which the flap is attachable in well-exposing position, and supporting means for the head and foot of said frame.

3. A cot convertible into a playchair comprising in combination, a frame, a flexible body suspended from and hanging below said frame and being fashioned at the front to form a well, a flap for covering the well, a back-rest detachably mounted on said frame, said flap being movable from well-covering position and attachable to the back rest, front and rear pairs of legs for supporting said frame, sockets on the frame for detachably receiving said legs, and detachable strut members connecting the legs in pairs and slightly spreading them to cause them to have effective frictional engagement in said sockets.

4. A convertible cot having a body provided with a well extending below the main portion of the bottom of the body, means whereby the body may be supported with said main portion substantially horizontal, a flap connected adjacent the junction of said well and bottom, back-rest means for the body having a portion displaceable extending into the body, means whereby said flap may be connected to said portion to in effect form part of the back rest or to said body above the base of the well and covering the well to form a continuation of the main portion of said bottom.

5. A car-cot comprising, in combination, a frame, a flexible body suspended from and hanging below said frame and being fashioned to form a well, detachable covering means for the well, a back-rest detachably mounted on said frame, means adjacent the head of said frame for anchoring a suspension support, leg supporting means for the foot of said frame comprising uprights connected at the bottom by a cross-board extending below said uprights, and sockets in the frame for detachably receiving said leg supporting means.

6. A convertible cot comprising, in combination, a frame, a flexible body suspended from and hanging below said frame and having a well, means whereby the cot may be engaged at the frame and supported in a substantially horizontal position, a flap connected adjacent the junction of said well and bottom, back-rest means for the body having a flexible portion extending into the body, means whereby said flap in well-exposing position may be connected to said flexible portion, and means whereby the flap may be secured to the body in well-covering position.

In testimony that I claim the foregoing to be my invention, I have signed my name this 10th day of January, 1930.

WILLIAM CLARE HUGHES.